United States Patent
Iwata et al.

(10) Patent No.: US 10,990,433 B2
(45) Date of Patent: Apr. 27, 2021

(54) EFFICIENT DISTRIBUTED ARRANGEMENT OF VIRTUAL MACHINES ON PLURAL HOST MACHINES

(71) Applicant: FUJITSU LIMITED, Kawasaki (JP)

(72) Inventors: Satoshi Iwata, Yokohama (JP); Hideaki Haruna, Shinjuku (JP); Akira Yoshimura, Nerima (JP); Yu Tomiyama, Sendai (JP); Tatsuya Koike, Chuo (JP); Jiaxing Xu, Nerima (JP)

(73) Assignee: FUJITSU LIMITED, Kawasaki (JP)

( * ) Notice: Subject to any disclaimer, the term of this patent is extended or adjusted under 35 U.S.C. 154(b) by 89 days.

(21) Appl. No.: 16/257,414

(22) Filed: Jan. 25, 2019

(65) Prior Publication Data

US 2019/0235907 A1    Aug. 1, 2019

(30) Foreign Application Priority Data

Jan. 30, 2018    (JP) .............................. JP2018-013260

(51) Int. Cl.
*G06F 9/455*    (2018.01)
*G06F 9/48*    (2006.01)
*G06F 9/50*    (2006.01)

(52) U.S. Cl.
CPC ........ *G06F 9/45558* (2013.01); *G06F 9/4856* (2013.01); *G06F 9/505* (2013.01); *G06F 9/5077* (2013.01); *G06F 9/5083* (2013.01); *G06F 2009/4557* (2013.01); *G06F 2209/503* (2013.01); *G06F 2209/505* (2013.01)

(58) Field of Classification Search
CPC .... G06F 9/45558; G06F 9/4856; G06F 9/505; G06F 9/5077; G06F 9/5083; G06F 2009/4557; G06F 2209/503; G06F 2209/505

See application file for complete search history.

(56) References Cited

U.S. PATENT DOCUMENTS

| | | | |
|---|---|---|---|
| 2016/0085579 A1 | 3/2016 | Machida | |
| 2018/0219723 A1* | 8/2018 | Scarpelli | ............... H04L 41/069 |
| 2019/0294479 A1* | 9/2019 | Pan | ......................... G06F 9/455 |

FOREIGN PATENT DOCUMENTS

WO    2014/192254    12/2014

OTHER PUBLICATIONS

Ajay Gulati et al., "VMware Distributed Resource Management: Design, Implementation, and Lessons Learned", VMware Technical Journal vol. 1, No. 1—Apr. 2012, pp. 45-64 (80 pages).

(Continued)

*Primary Examiner* — Emerson C Puente
*Assistant Examiner* — Jonathan R Labud
(74) *Attorney, Agent, or Firm* — Fujitsu Patent Center

(57) ABSTRACT

An apparatus determines a similarity of names of a plurality of virtual machines, and divides the plurality of virtual machines into clusters based on a result of the determination such that virtual machines having a value that represents the similarity of the names that is equal to or less than a given threshold are included in a first cluster and virtual machines having a value that represents the similarity of the names that is greater than the given threshold are included in a second cluster. The apparatus places virtual machines included in the first cluster on different host machines.

10 Claims, 14 Drawing Sheets

(56) References Cited

OTHER PUBLICATIONS

Sai Manohar Inabattini et al., "DRS Performance VMware vSphere 6.5", Performance Study—Nov. 2016, [online], VMware Inc., [retrieved on Jan. 5, 2018], Internet, <URL:https://www.vmware.com/techpapers/2016/drs-vsphere65-pref.html> (27 pages).
VMware Best Practices, "VMware Infrastructure Resource Management with VMware DRS", (24 pages).

* cited by examiner

FIG. 4

|         | fj-db-0 | fj-db-1 | iwata0 | iwata1 | iwata2 |
|---------|---------|---------|--------|--------|--------|
| fj-db-0 |         |         |        |        |        |
| fj-db-1 |         |         |        |        |        |
| iwata0  |         | 1       |        | 7      | 7      |
| iwata1  |         |         | 6      |        | 7      |
| iwata2  |         |         | 7      | 6      |        |
|         |         |         | 1      | 1      | 1      |
|         |         |         |        | 1      | 1      |

FIG. 7

| | HOST #0 | HOST #1 | HOST #2 | HOST #3 |
|---|---|---|---|---|
| THE NUMBER OF CPUS | 16 | 8 | 14 | 10 |
| MEMORY MOUNT (GB) | 128 | 64 | 64 | 100 |

| | THE NUMBER OF vCPUS | MEMORY AMOUNT (GB) |
|---|---|---|
| iwata0 | 1 | 1 |
| iwata1 | 2 | 2 |
| iwata2 | 3 | 3 |
| fj-db-0 | 4 | 4 |
| fj-db-1 | 5 | 5 |

FIG. 9

| | THE NUMBER OF vCPUS | MEMORY AMOUNT |
|---|---|---|
| iwata | 6 | 6 |
| fj-db | 9 | 9 |

F I G. 1 0

| HOST #0 | HOST #1 | HOST #2 | HOST #3 |
|---------|---------|---------|---------|
| fj-db-1 |         |         | fj-db-0 |

FIG. 11

| | HOST #0 | HOST #1 | HOST #2 | HOST #3 |
|---|---|---|---|---|
| THE NUMBER OF CPUS | 11 | 8 | 14 | 6 |
| MEMORY AMOUNT (GB) | 123 | 64 | 64 | 96 |

| HOST #0 | HOST #1 | HOST #2 | HOST #3 |
|---------|---------|---------|---------|
| fj-db-1 |         |         | fj-db-0 |
| iwata1  | iwata0  | iwata2  |         |

EFFICIENT DISTRIBUTED ARRANGEMENT OF VIRTUAL MACHINES ON PLURAL HOST MACHINES

CROSS-REFERENCE TO RELATED APPLICATION

This application is based upon and claims the benefit of priority of the prior Japanese Patent Application No. 2018-13260, filed on Jan. 30, 2018, the entire contents of which are incorporated herein by reference.

FIELD

The embodiments discussed herein are related to efficient distributed arrangement of virtual machines on plural host machines.

BACKGROUND

In recent years, as typified by cloud computing, virtualization of computers has been actively carried out with the main aim of efficient use of computer resources. In a computer virtualization environment, for example, virtual machines (VM) are monitored and the virtual machines are properly placed in a distributed manner on plural host computers (hereinafter, referred to simply as host) according to the resource use rate to thereby carry out leveling of the load among the hosts and intend improvement in the use efficiency of computer resources and the performance.

The virtual machines are placed in such a manner that leveling of computational resources such as central processing unit (CPU), memory, and network among the hosts is implemented. For example, if the CPU utilization of host A is significantly high compared with the CPU utilization of host B, an adequate virtual machine is selected from host A and is migrated (transferred) to host B. Thereby, the difference in the CPU utilization between the hosts is alleviated.

Furthermore, when placement of virtual machines is decided, the case in which specific virtual machines are not desired to be placed on the same host exists in terms of improvement in the availability. For example, even when virtual machine α and virtual machine β that offer the same function are prepared to intend improvement in the availability, if these two virtual machines a and β are placed on the same host, both virtual machines fall into failure at the time of the occurrence of host failure. Due to this, it is difficult to achieve improvement in the availability, which is the original purpose. Thus, a technique is also carried out in which rules relating to placement of virtual machines are individually set explicitly to avoid placement of virtual machines that offer the same function on the same host.

An example of the related art is disclosed in International Publication Pamphlet No. WO 2014/192254.

Other examples of the related art are disclosed in the following non-patent materials: Ajay Gulati et al., "VMware Distributed Resource Management: Design, Implementation, and Lessons Learned," VMware Technical Journal (VMT) Spring 2012); Sai Manohar Inabattini et al., "DRS PERFORMANCE VMware vSphere 6.5," PERFORMANCE STUDY-NOVEMBER 2016, [online], VMware Inc., [retrieved on Jan. 5, 2018], the Internet, <URL:https://www.vmware.com/techpapers/2016/drs-vsphere65-per-f.html>; and VMware Infrastructure Resource Management with VMware DRS, VMWARE BEST PRACTICES.

SUMMARY

According to an aspect of the embodiments, an information processing apparatus determines a similarity of names of a plurality of virtual machines, and divides the plurality of virtual machines into clusters, based on a result of the determination, such that virtual machines having a value that represents the similarity of the names that is equal to or less than a given threshold are included in a first cluster and virtual machines having a value that represents the similarity of the names that is greater than the given threshold are included in a second cluster. The apparatus places virtual machines included in the first cluster on different host machines.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 4 is a diagram exemplifying inter-string distances between VM names in a computer system as one example of the first embodiment;

FIG. 7 is a diagram exemplifying resource information in a computer system exemplified in FIG. 1;

FIG. 8 is a diagram exemplifying scheduled amounts of use of computational resources by VMs in a computer system as one example of the first embodiment;

FIG. 9 is a diagram exemplifying scheduled use amounts of computational resources about each cluster in a computer system as one example of the first embodiment;

FIG. 10 is a diagram exemplifying a state of placement of VMs on hosts in a computer system as one example of the first embodiment;

FIG. 11 is a diagram exemplifying resource information after allocation of VMs to hosts in a computer system exemplified in FIG. 1;

FIG. 12 is a diagram exemplifying a state of placement of VMs on hosts in a computer system as one example of the first embodiment;

DESCRIPTION OF EMBODIMENTS

To implement leveling of the use rate of computational resources among hosts at a certain moment and also over the future, it is effective to find virtual machines with similar characteristics and place these virtual machines on different hosts in a distributed manner. The resource use rate of each virtual machine changes from hour to hour. For this reason, for example, if a group of virtual machines in which the load increases at the same clock time is placed on the same host, the load of the host drastically increases at a certain timing. On the other hand, drastic fluctuations of the load of the host may be suppressed if virtual machines different in the timing when the load rises up may be placed on the same host.

However, in the related-art placement management methods of virtual machines like the above-described methods, although it is possible to save the past resource use rate and compare the transition of the resource use rate among the virtual machines, it is impractical to execute such comparison processing on all computational resources among all virtual machines in a large-scale system environment. For example, in the related-art placement management methods of virtual machines, there is a limit to the placement of virtual machines with similar characteristics on different hosts.

Furthermore, the method in which virtual machines that are not desired to be placed on the same host are individually set is troublesome and time-consuming. Moreover, a situation in which it is difficult for the administrator of a virtualization environment to know services that operate on virtual machines as in a cloud computing environment is also conceivable.

In one aspect, it is preferable to enable efficient distributed placement of virtual machines on plural host machines.

Embodiments relating to the present information processing apparatus, present information system, and control program will be described below with reference to the drawings. However, the embodiments represented below are merely exemplification and do not intend to exclude application of various modification examples and techniques that are not clearly represented in the embodiments. For example, the present embodiments may be carried out with various modifications (combining the embodiments and the respective modification examples, and so forth) without departing from the gist thereof. Furthermore, each diagram does not purport to include only the constituent elements illustrated in the diagram and may include other functions and so forth.

(I) Description of First Embodiment (A) Configuration

Figure 1:
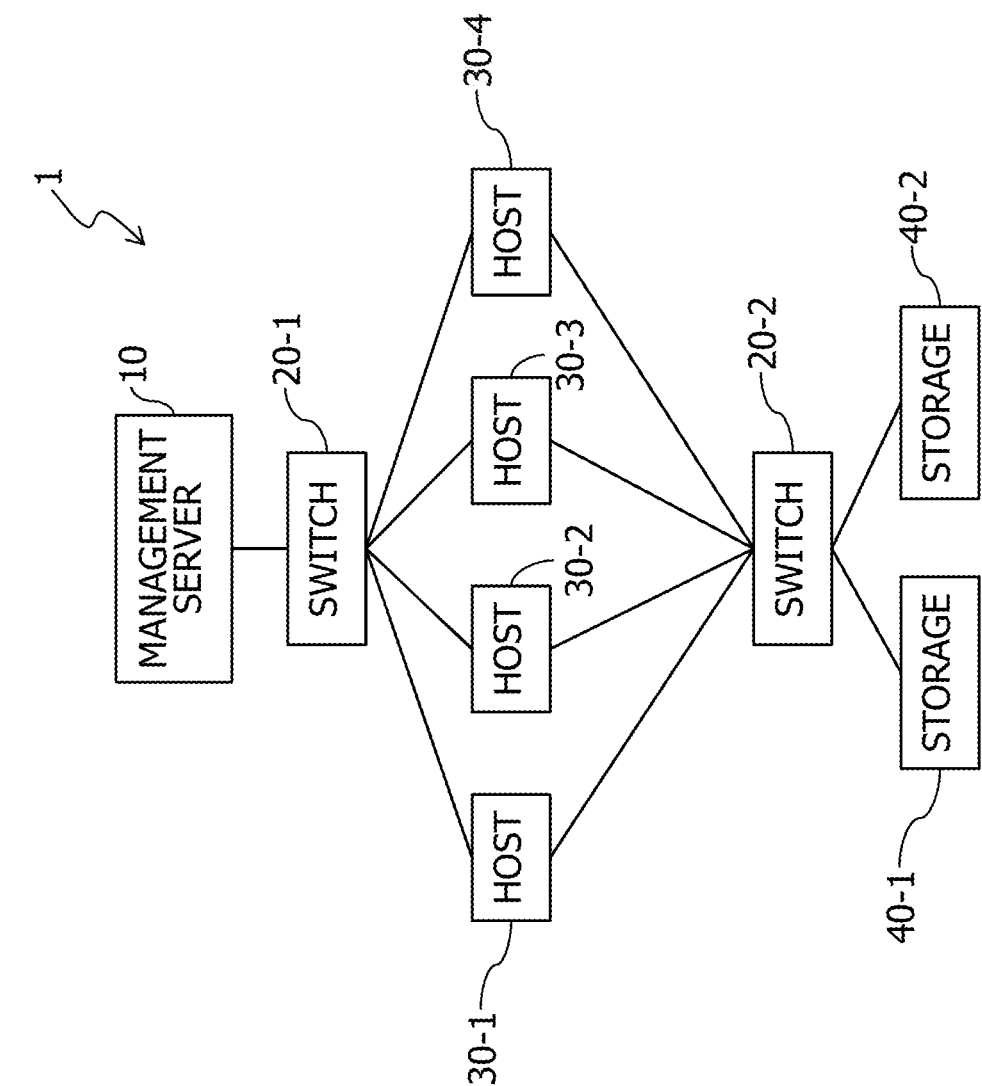
FIG. 1 is a diagram schematically illustrating a configuration of a computer system as one example of a first embodiment.

FIG. 1 is a diagram schematically illustrating a configuration of a computer system as one example of a first embodiment.

A computer system 1 illustrated in FIG. 1 is used for a cloud computing system, for example, and provides arithmetic capability and storage area to users and so forth.

The computer system 1 exemplified in FIG. 1 includes a management server 10, switches 20-1 and 20-2, host computers 30-1 to 30-4, and storages 40-1 and 40-2.

Furthermore, the management server 10, the host computers 30-1 to 30-4, and the storages 40-1 and 40-2 are coupled communicably with each other through a network.

For example, in the computer system 1 exemplified in FIG. 1, the host computers 30-1 to 30-4 are each coupled to the management server 10 through the switch 20-1 and are each coupled to the storages 40-1 and 40-2 through the switch 20-2. The switches 20-1 and 20-2 are network relay apparatuses and transfer received data according to the address, for example.

The storages 40-1 and 40-2 are storing apparatuses such as hard disk drive (HDD), solid state drive (SSD), and storage class memory (SCM) and store various kinds of data and so forth. Furthermore, the storages 40-1 and 40-2 may be what are obtained by configuring redundant arrays of inexpensive disks (RAID) by using plural storing apparatuses.

[Host Computer 30]

The host computers 30-1 to 30-4 are computers having server functions. These host computers 30-1 to 30-4 have a similar configuration as each other. Hereinafter, as numerals that denote the host computers, numerals 30-1 to 30-4 are used when one of the plural host computers is specified and numeral 30 is used when referring to an arbitrary host computer. Furthermore, the host computer 30 will be often referred to simply as the host 30 hereinafter.

Each host 30 includes CPU, memory, storing apparatus, and network interface (I/F) that are not illustrated, for example.

The storing apparatus is a storing apparatus such as HDD, SSD, and SCM and stores various kinds of data. Each host 30 may be equipped with one or more storing apparatuses.

The network I/F is a communication interface communicably coupled to the management server 10, the other hosts 30, and the storages 40-1 and 40-2 through the switches 20-1 and 20-2. The network I/F is a local area network (LAN) interface or a fibre channel (FC) interface, for example.

The memory is a storage memory including read only memory (ROM) and random access memory (RAM). To the ROM of the memory, an operating system (OS), a software program for implementing a computer virtualization environment, and pieces of data for this program are written. The software program on the memory is read into the CPU and is executed as appropriate. Furthermore, the RAM of the memory is used as a primary storage memory or a working memory.

The CPU is a processing apparatus (processor) in which control unit (control circuit), arithmetic unit (arithmetic circuit), cache memory (register group), and so forth are incorporated, and carries out various kinds of control and arithmetic operation. The CPU implements various functions by executing the OS or program stored in the memory.

The CPU executes the control program in each host 30 included in the present computer system 1 to implement functions as a hypervisor to be described later.

The program for implementing the functions as the hypervisor (control program for the host) is provided in the form of being recorded on a computer-readable recording medium such as flexible disc, compact disc (CD) (CD-ROM, CD-recordable (R), CD-rewritable (RW), or the like), digital versatile disc (DVD) (DVD-ROM, DVD-RAM, DVD-R, DVD+R, DVD-RW, DVD+RW, HD DVD, or the like), Blu-ray disc, magnetic disc, optical disc, or magneto-optical disc. Then, a computer reads the program from the recording medium and transfers the program to an internal storing apparatus or an external storing apparatus to store and use the program. Furthermore, the program may be recorded on a storing apparatus (recording medium) such as magnetic disc, optical disc, or magneto-optical disc and be provided from the storing apparatus to a computer through a communication path.

In implementing the functions as the hypervisor, the program stored in the internal storing apparatus (in the present embodiment, memory) is executed by a microprocessor (in the present embodiment, CPU) of the computer. At this time, the computer may read and execute the program recorded on a recording medium.

The hypervisor is a software program (control program) for implementing a computer virtualization environment based on the VM. The hypervisor has a function of creating a VM (VM creation function) and creates a VM in accordance with a VM creation instruction transmitted from a VM creation instruction unit 110 of the management server 10 to be described later. The creation of a VM may be implemented by known various methods and description thereof is omitted.

Furthermore, the hypervisor causes one or more VMs to function in the host 30 on which this hypervisor operates.

The VM is a virtual computer created on the hypervisor. Each VM executes various kinds of processing by using a basic input/output System (BIOS) and pieces of peripheral equipment such as CPU, memory, disc, keyboard, mouse, and CD-ROM drive similarly to a computer implemented with physical hardware. For example, the VM executes various kinds of OS (guest OS) and application programs that operate on the guest OS.

[Management Server 10]

The management server 10 is a management apparatus that carries out management of the VM implemented in each host 30. For example, the management server 10 decides placement of VMs among the plural hosts 30 and instructs the host 30 decided as the placement destination of the VM to create the VM. Furthermore, the management server 10 makes an instruction to migrate (transfer) a VM between the hosts 30.

Figure 2:
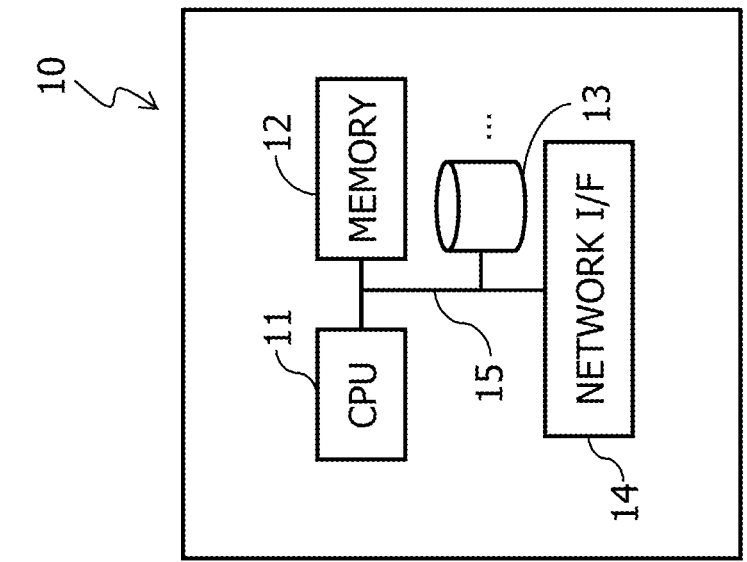
FIG. 2 is a diagram exemplifying a hardware configuration of a management server in a computer system as one example of the first embodiment.
Figure 3:
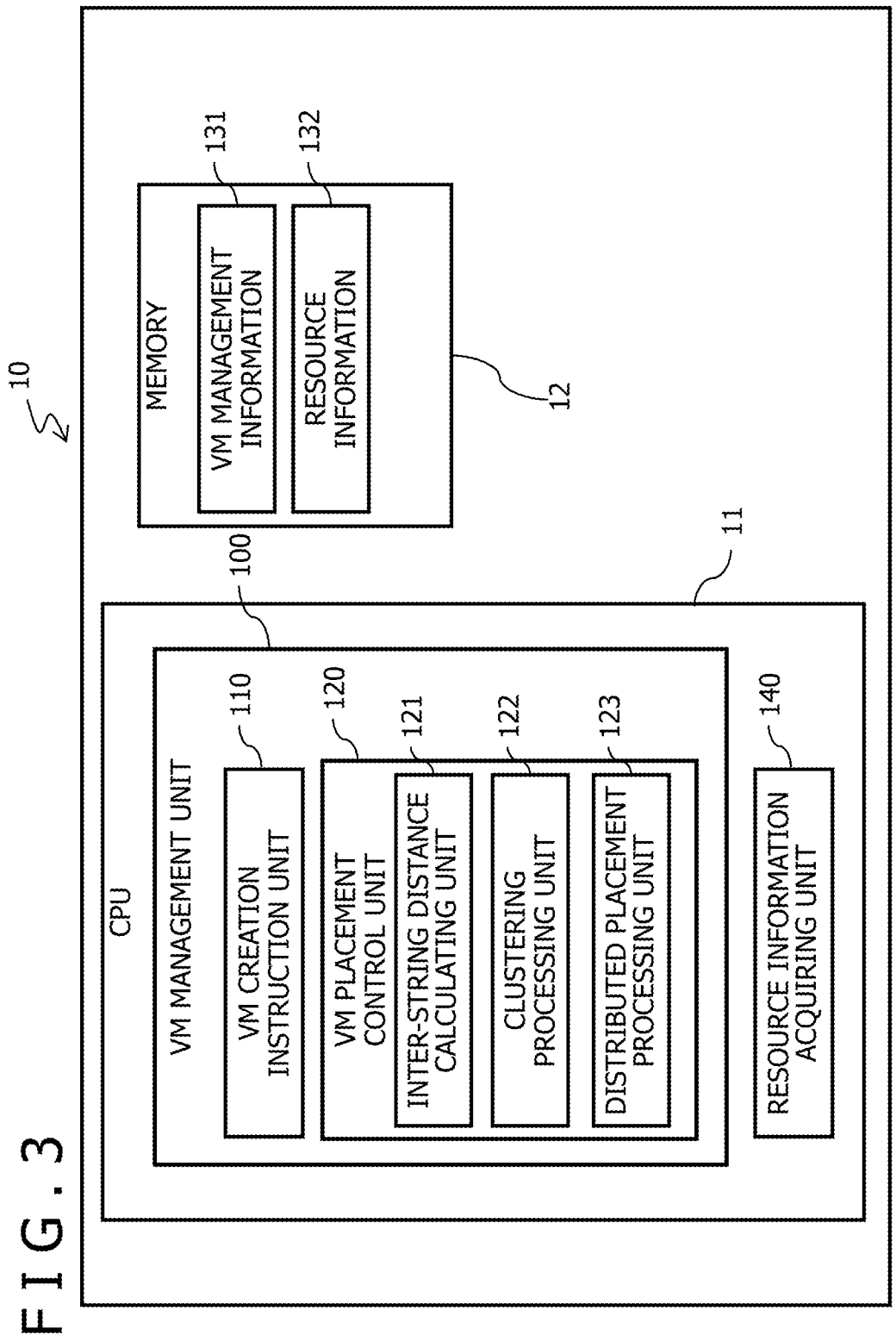
FIG. 3 is a functional configuration diagram of a management server in a computer system as one example of the first embodiment.

FIG. 2 is a diagram exemplifying a hardware configuration of a management server in a computer system as one example of the first embodiment and FIG. 3 is a functional configuration diagram thereof. The management server illustrated in FIGS. 2 and 3 and the computer system illustrated by reference to FIGS. 2 and 3 may be the management server 10 and the computer system 1 illustrated in FIG. 1.

As illustrated in FIG. 2, the management server 10 includes a CPU 11, a memory 12, a storing apparatus 13, and a network interface (I/F) 14.

The storing apparatus 13 is a storing apparatus such as HDD, SSD, and SCM and stores various kinds of data and programs.

The network I/F 14 is a communication interface communicably coupled to the hosts 30-1 to 30-4 and the storages 40-1 and 40-2 through the switch 20-1 and is a LAN interface or an FC interface, for example.

The memory 12 is a storage memory including ROM and RAM. To the ROM of the memory 12, an OS, a software program relating to management of the OS and the VM, and pieces of data for this program are written. The software program on the memory 12 is read into the CPU 11 and is executed as appropriate. Furthermore, the RAM of the memory 12 is used as a primary storage memory or a working memory.

Furthermore, as illustrated in FIG. 3, VM management information 131 and resource information 132 are stored in the RAM of the memory 12.

The VM management information 131 is information to manage the VM placed in each host 30. In the VM management information 131, the names of the VMs (VM names) are stored, for example. Furthermore, information on computational resources used to implement each VM (for example, the number of CPUs and the memory amount) may be included in the VM management information 131.

The information configuring the VM management information 131 is stored in a given storage area in the RAM. The management server 10 manage the VM name and so forth of each VM by using the VM management information 131. The resource information 132 will be described later.

The CPU 11 is a processing apparatus (processor) in which control unit (control circuit), arithmetic unit (arithmetic circuit), cache memory (register group), and so forth are incorporated, and carries out various kinds of control and arithmetic operation. The CPU 11 implements various functions by executing the OS or program stored in the memory 12.

The CPU 11 executes the control program for the management server in the management server 10 included in the present computer system 1 to implement functions as a VM management unit 100 and a resource information acquiring unit 140.

The program for implementing the functions as the VM management unit 100 and the resource information acquiring unit 140 (control program for the management server) is provided in the form of being recorded on a computer-readable recording medium such as flexible disc, CD (CD-ROM, CD-R, CD-RW, or the like), DVD (DVD-ROM, DVD-RAM, DVD-R, DVD+R, DVD-RW, DVD+RW, HD DVD, or the like), Blu-ray disc, magnetic disc, optical disc, or magneto-optical disc. Then, a computer reads the program from the recording medium and transfers the program to an internal storing apparatus or an external storing apparatus to store and use the program. Furthermore, the program may be recorded on a storing apparatus (recording medium) such as magnetic disc, optical disc, or magneto-optical disc and be provided from the storing apparatus to a computer through a communication path.

In implementing the functions as the VM management unit 100 and the resource information acquiring unit 140, the program stored in the internal storing apparatus (in the present embodiment, memory 12) is executed by a microprocessor (in the present embodiment, CPU 11) of the computer. At this time, the computer may read and execute the program recorded on a recording medium.

The resource information acquiring unit 140 acquires information relating to computational resources in the present computer system 1. For example, the resource information acquiring unit 140 acquires information that represents the amount of unused part of the computational resources in each host 30.

For example, the resource information acquiring unit 140 acquires the number of unused CPUs, the unused memory amount, the network band, and so forth in each host 30 as the resource information. The number of CPUs may be the number of CPU cores.

The resource information acquiring unit 140 stores the acquired resource information in the memory 12 as the resource information 132 (see FIG. 7 and FIG. 11). The management server 10 manages the use status of the computational resources in each host 30 by using the resource information 132.

The resource information acquiring unit 140 may periodically acquire information on the computational resources from each host 30 and may acquire information on the computational resources from each host 30 at any time in response to a request from a VM placement control unit 120.

The VM management unit 100 carries out management of the VM in the present computer system 1. As illustrated in FIG. 3, the VM management unit 100 has functions as the VM creation instruction unit 110 and the VM placement control unit 120.

The VM creation instruction unit 110 issues an instruction that makes each host 30 create a VM (VM creation instruction). For example, in the present computer system 1, when a user inputs a request for creation of a VM from a terminal apparatus (illustration is omitted), the VM creation instruction unit 110 issues the VM creation instruction to the host 30 in response to the VM creation request.

The user inputs the name of the VM requested to be created (VM name) with the VM creation request. Furthermore, when inputting the VM creation request, the user may input the scheduled use amounts of the computational resources, such as the number of CPUs, memory amount, and so forth the VM is caused to use.

The VM creation instruction unit 110 transmits, to the host 30, the VM name input by the user with the VM creation instruction. Furthermore, the VM creation instruction unit 110 may transmit, to the host 30, the scheduled use amounts of the computational resources (the number of CPUs, memory amount, and so forth) relating to the relevant VM with the VM creation instruction.

In the host 30 that has received the VM creation instruction, the VM is created by the VM creation function of the hypervisor. The VM name input by the user or the like is set in the VM created in the host 30. The set VM name is stored in the VM management information 131.

Furthermore, in the VM management information 131, the scheduled amounts of use of the computational resources by the VM are also stored corresponding to the relevant VM (see FIG. 8).

The scheduled amounts of use of the computational resources by the VM are the number of CPUs (the number of CPU cores) used by the VM, the memory amount used by the VM, the network band used, for example. Furthermore, particularly as the number of CPUs used by the VM, the number of virtual CPUs (vCPUs) may be used.

The scheduled amounts of use of the computational resources by the VM may be acquired as specifications when the VM is created, for example, and may be acquired by known various methods.

The VM placement control unit 120 decides the host 30 of the placement destination of the VM.

Incidentally, naming of the VM is important in terms of operation and it is common to include a function name (for example, web or db), a service name (for example, serviceA or fujitsu), or the like in the VM name. For example, information that represents characteristics of the VM is included in the VM name in many cases.

In the present computer system 1, the VM placement control unit 120 pays attention to the VM name and implements distributed placement by which virtual machines with similar characteristics are placed on different hosts 30. For example, the VM placement control unit 120 places plural VMs having similar VM names on different hosts 30 in a distributed manner (distributed placement).

For example, at the time of service start or the like in the present computer system 1, the VM placement control unit 120 decides the placement destination (placement destination host 30) of each VM regarding all VMs executed on the present computer system 1. In deciding the placement destination of these VMs, the VM placement control unit 120 carries out distributed placement based on the VM name.

Furthermore, in the present first embodiment, the VM placement control unit 120 studies the host 30 of the placement destination of each VM based on the VM names of the respective VMs scheduled to be placed on all hosts 30 included in the present computer system 1.

As illustrated in FIG. 3, the VM placement control unit 120 has functions as an inter-string distance calculating unit 121, a clustering processing unit 122, and a distributed placement processing unit 123.

The inter-string distance calculating unit 121 executes processing (arithmetic operation) of quantifying the similarity between VM names.

For example, regarding each of the respective VM names of all VMs included in the present computer system 1, the inter-string distance calculating unit 121 calculates the inter-string distances between the character string configuring each VM name and the VM names of the other VMs. The inter-string distance is a value that represents how much two character strings are different. For example, suppose that the inter-string distance indicates that the compared two character strings are more similar when the distance is shorter, for example, the value is smaller. It may also be said that the inter-string distance is a value that represents the degree of similarity between the two character strings (VM names).

As the inter-string distance, the Levenshtein distance, the N-gram, the Jaro-Winkler distance, or the like may be used, for example. Furthermore, the inter-string distance is not limited to these distances and a method other than these distances may be used and the inter-string distance may be implemented with appropriate changes.

FIG. 4 is a diagram exemplifying inter-string distances between VM names in a computer system as one example of the first embodiment. The computer system illustrated by reference to FIG. 4 may be the computer system 1 illustrated in FIG. 1. The inter-string distances exemplified in the FIG. 4 are represented by using the Levenshtein distance.

In the FIG. 4, the inter-string distances between the respective character strings in five VM names "fj-db-0," "fj-db-1," "iwata0," "iwata1," and "iwata2" are exemplified. For example, the inter-string distance between the VM name "fj-db-0" and the VM name "fj-db-1" is "1" and the inter-string distance between the VM name "fj-db-0" and the VM name "iwata0" is "6."

The inter-string distance calculating unit 121 functions as a determining unit that determines the similarity between VM names.

The clustering processing unit 122 carries out clustering (dividing) of all VMs included in the present computer system 1 into plural clusters based on the inter-string distances calculated by the inter-string distance calculating unit 121.

Known various methods may be used for the clustering by the clustering processing unit 122. For example, the nearest neighbor method or the k-means method may be used. Furthermore, the clustering method is not limited to these methods and a method other than these methods may be used, and the clustering method may be carried out with appropriate changes.

The clustering processing unit 122 functions as a dividing unit that divides plural VMs into one or more sets (clusters) in such a manner that VMs about which the inter-string distance representing the similarity between VM names is equal to or shorter than a given threshold make a set.

In carrying out the clustering, the proper number of clusters will change according to the application environment. Thus, it is desirable that the administrator or the like advance the clustering while checking the status in the beginning.

Figure 5:
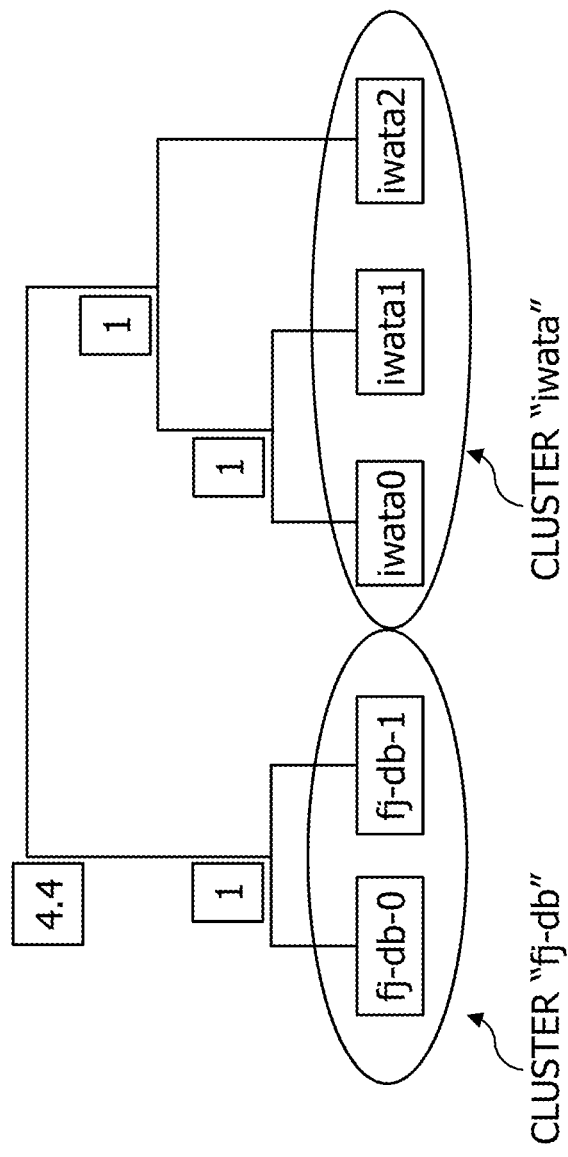
FIG. 5 is a diagram exemplifying a clustering method of VMs in a computer system as one example of the first embodiment.

FIG. 5 is a diagram exemplifying a clustering method of VMs in a computer system as one example of the first embodiment. The computer system illustrated by reference to FIG. 5 may be the computer system 1 illustrated in FIG. 1. In the FIG. 5, an example in which the five VM names exemplified in FIG. 4 are clustered into two clusters by the nearest neighbor method is represented.

In the example represented in FIG. 5, a cluster "fj-db" includes two VMs with the VM name "fj-db-0" and the VM name "fj-db-1" and a cluster "iwata" includes three VMs with the VM names "iwata0," "iwata1," and "iwata2."

The distributed placement processing unit 123 places all VMs included in the present computer system 1 on plural hosts 30 in a distributed manner.

In placing the respective VMs included in the plural clusters divided by the clustering processing unit 122 on the plural hosts 30, the distributed placement processing unit 123 places VMs in the same cluster on the different hosts 30 as far as possible.

As the result of the clustering by the clustering processing unit 122, the VM names of the VMs included in the same cluster have a short inter-string distance and are similar to each other. Furthermore, as described above, the VMs whose VM names are similar may be regarded as VMs having similarities also in characteristics thereof.

The distributed placement processing unit 123 implements leveling of computational resources among the hosts 30 by carrying out the distributed placement of VMs thought to have similarities in characteristics on the hosts 30 different from each other as above.

The distributed placement processing unit 123 functions as a placement unit that places the VMs included in the same cluster (set) on the different hosts 30.

Furthermore, in carrying out the distributed placement of VMs on the plural hosts 30, also in consideration of the resource use rate, the distributed placement processing unit 123 decides the placement on the hosts 30 in a form in which a large bias is not caused in the number of VMs and the resource use rate.

For example, the distributed placement processing unit 123 implements the distributed placement of VMs on the plural hosts 30 by repeatedly executing the following processing 1 to 4 for each cluster.

(Processing 1) The total of the computational resource use rates of VMs included in each cluster is calculated (Processing 2) The total surplus resource of the host 30 is calculated regarding each computational resource (Processing 3) With attention paid to a computational resource with a low surplus ratio, distributed placement on the hosts 30 is carried out from a cluster with a high total resource use rate preferentially (Processing 4) In carrying out the distributed placement, the VMs are placed on the hosts 30 with large surplus resource amounts The distributed placement processing unit 123 preferentially places a VM with a high resource use rate on the host 30 by executing the above-described processing 2 to 4. This may avoid a situation in which it is difficult to place virtual machines of the same cluster on the different hosts 30 in a final phase due to limitation of the resource use rate.

If a rule to be given priority when placement of VMs is decided (for example, "fj-db-0 and iwata2 are placed on different hosts 30") is settled, the distributed placement processing unit 123 carries out distributed placement based on the VM name after ending placement that meets the rule.

Figure 13:
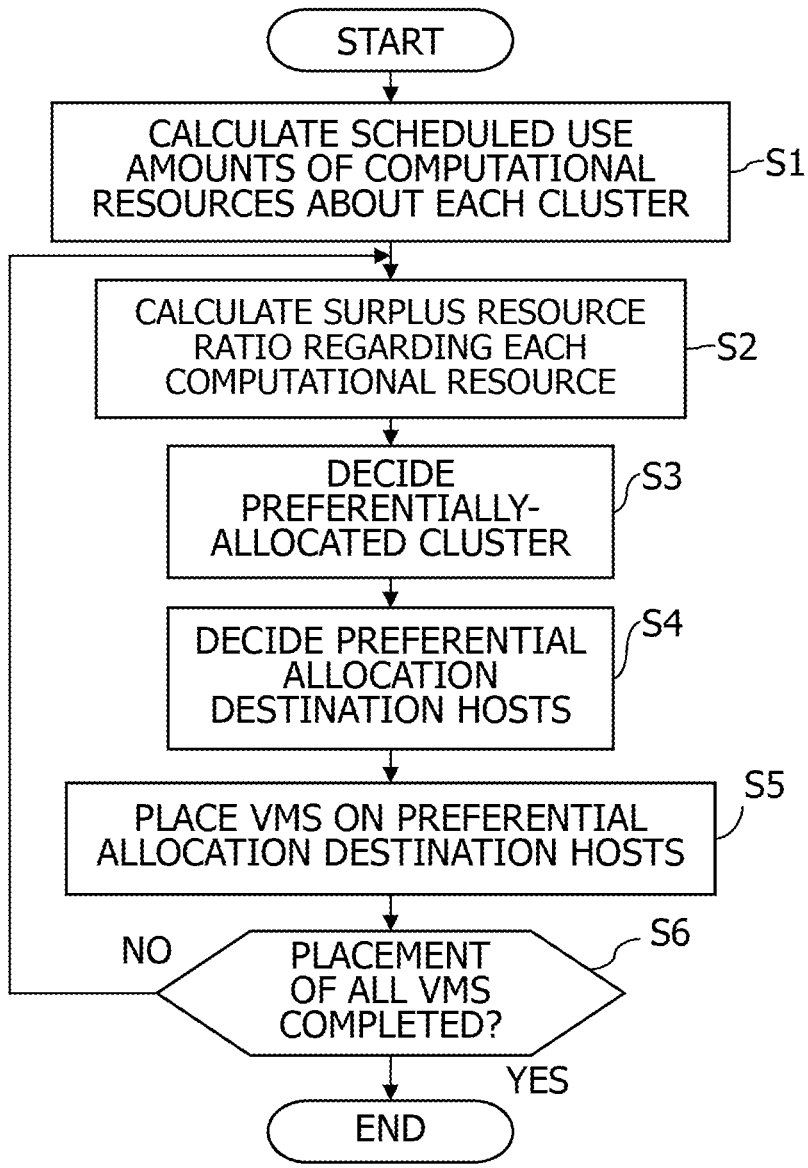
FIG. 13 is a flowchart for explaining processing of placing clustered VMs on plural hosts by a distributed placement processing unit in a computer system as one example of the first embodiment.

Processing of placing clustered VMs on plural hosts 30 by the distributed placement processing unit 123 will be described below in accordance with a flowchart illustrated in FIG. 13 (steps S1 to S6) with reference to FIG. 6 to FIG. 12 as needed.

Figure 6:
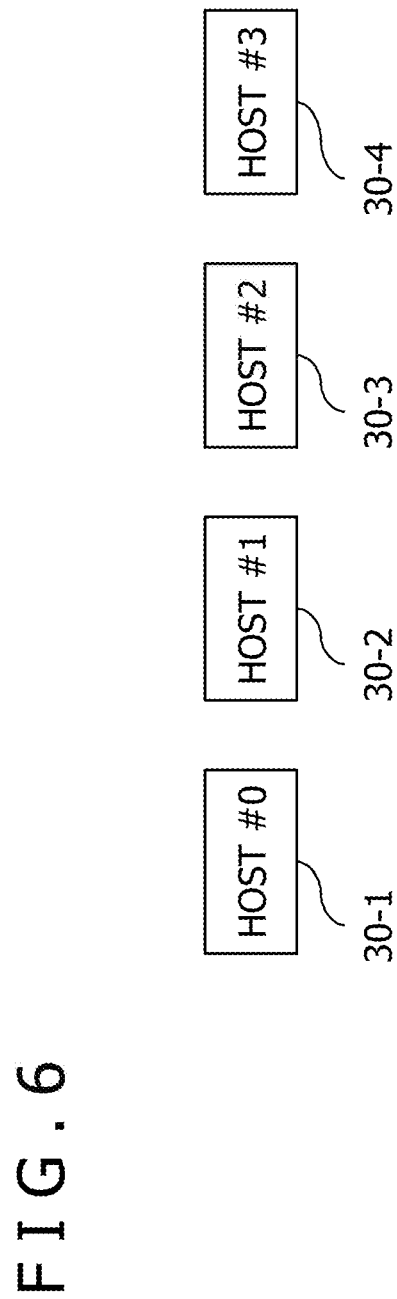
FIG. 6 is a diagram in which hosts of a computer system exemplified in FIG. 1 are excerpted and illustrated.

FIG. 6 is a diagram in which only the hosts 30-1 to 30-4 of the computer system 1 exemplified in FIG. 1 are excerpted and illustrated.

Hereinafter, the host 30-1 will be often represented as host #0. Similarly, the hosts 30-2, 30-3, and 30-4 will be often represented as hosts #1, #2, and #3, respectively.

In the following, an example in which the five VMs with the VM names "fj-db-0," "fj-db-1," "iwata0," "iwata1," and "iwata2" exemplified in FIG. 4 are placed on these four hosts #0 to #3 in a distributed manner will be represented.

Furthermore, hereinafter, the VM having the VM name "fj-db-0" will be often referred to simply as VM "fj-db-0." Similarly, the respective VMs having the VM names "fj-db-1," "iwata0," "iwata1," and "iwata2" will be often referred to as VM "fj-db-1," VM "iwata0," VM "iwata1," and VM "iwata2," respectively.

FIG. 7 is a diagram exemplifying the resource information 132 in the computer system 1 exemplified in FIG. 1.

In the resource information 132 exemplified in the FIG. 7, the state of surplus resources (surplus resource amounts) in each host 30 at a timing immediately before distributed placement of the five VMs exemplified in FIG. 4 on hosts #0 to #3 is carried out is represented. The surplus resource amount represents the amount (number or capacity) of unused part in a computational resource with which the host 30 is equipped.

In the example represented below, an example in which computational resources are CPU and memory is represented. In FIG. 7, the number of unused CPUs (the number of core CPUs) and the memory amount that is not used are registered in the resource information 132.

For example, the surplus resource amounts of the memory (memory amounts) about hosts #0, #1, #2, and #3 are 128 GB, 64 GB, 64 GB, and 100 GB, respectively. These values are acquired by the resource information acquiring unit 140.

FIG. 8 is a diagram exemplifying the scheduled amounts of use of the computational resources by the VMs in the computer system 1 as the one example of the first embodiment.

In the example represented in the FIG. 8, the scheduled amounts of use of each computational resource by the five VMs exemplified in FIG. 4 are represented.

For example, for implementation of the VM "iwata0," one CPU (the number of vCPUs=1) and a memory amount of 1 GB are used.

In the step S1, the distributed placement processing unit 123 calculates the scheduled use amounts of the computational resources about each cluster by tallying up the scheduled amounts of use of the computational resources by each VM regarding each cluster.

FIG. 9 is a diagram exemplifying the scheduled use amounts of the computational resources about each cluster in the computer system 1 as the one example of the first embodiment.

In the example represented in the FIG. 9, the scheduled amounts of use of the computational resources by the plural VMs included in each cluster are tallied up regarding each of the two clusters "fj-db" and "iwata" exemplified in FIG. 5.

For example, the scheduled use amount of CPU (the number of vCPUs) about the cluster "iwata" is obtained by summing up the respective numbers of vCPUs of the three VMs "iwata0," "iwata1," and "iwata2" included in the cluster "iwata" (the number of vCPUs: 6=1+2+3). Similarly, the scheduled use amount of memory about the cluster "iwata" is obtained by summing up the respective scheduled use amounts of memory of the three VMs "iwata0," "iwata1," and "iwata2" included in the cluster "iwata" (memory amount: 6=1+2+3).

Next, in the step S2, the distributed placement processing unit 123 calculates the surplus resource ratio regarding each computational resource.

The surplus resource ratio is the ratio of the total of the surplus resource amount of all hosts 30 in the VM non-placed state to the total of the physical resource of all hosts 30 included in the present computer system 1.

For example, if the number of CPU cores is 16 and the memory size is 128 GB as the physical resources of each host 30 in the state in which none of VMs is placed (VM non-placed state), and if surplus resource amounts in each host 30 is as indicated in the FIG. 7, the surplus resource ratio of each computational resource is obtained by the following expressions (1) and (2).

$$\text{Surplus resource ratio of CPU} = (16+8+14+10)/(16 \times 4) \times 100 = 75\% \quad (1)$$

$$\text{Surplus resource ratio of memory} = (128+64+64+100)/(128 \times 4) \times 100 = 70\% \quad (2)$$

The distributed placement processing unit 123 identifies the computational resource with a low surplus ratio based on the surplus resource ratio regarding each computational resource calculated as described above.

In the calculation example based on the above-described expressions (1) and (2), it is indicated that the surplus resource ratio of the memory is lower than the CPU. The computational resource whose surplus resource ratio is lower in plural kinds of computational resources as above is referred to as a preferential computational resource in some cases.

The distributed placement processing unit 123 pays attention to the identified preferential computational resource and refers to the scheduled use amount of the computational resource about each cluster (see FIG. 9) to decide the VMs configuring the cluster whose total scheduled use amount of the preferential computational resource is as large as VMs that are preferentially allocated. Hereinafter, the cluster whose total scheduled use amount of the preferential computational resource in the plural clusters will be often referred to as the preferentially-allocated cluster.

The distributed placement processing unit 123 pays attention to the preferential computational resource and refers to the scheduled use amount of the computational resource about each cluster (see FIG. 9) to decide the cluster whose total scheduled use amount of the preferential computational resource is as large as the preferentially-allocated cluster (step S3).

The distributed placement processing unit 123 pays attention to the identified preferential computational resource (memory amount) and refers to the scheduled use amount of the computational resource about each cluster (see FIG. 9) to identify the cluster whose total scheduled use amount of the memory amount is as large as the preferentially-allocated cluster. In the example represented in FIG. 9, the total scheduled use amount of the memory amount of the cluster "fj-db" is larger than the cluster "iwata" and therefore the cluster "fj-db" is selected as the preferentially-allocated cluster.

The distributed placement processing unit 123 decides the VMs configuring this preferentially-allocated cluster as VMs preferentially placed on the hosts 30 in a distributed manner. In the example represented in FIG. 9, the distributed placement processing unit 123 preferentially allocates the VMs "fj-db-0" and "fj-db-1" of the cluster "fj-db," which is the preferentially-allocated cluster, to the hosts 30 and thereafter allocates the VMs "iwata0" to "iwata2" of the cluster "iwata" to the hosts 30.

In carrying out the distributed placement of the VMs, the distributed placement processing unit 123 places the VMs on the hosts 30 with large surplus resource amounts preferentially.

Hereinafter, the host 30 with a large surplus resource amount in the plural hosts 30 will be often referred to as the preferential allocation destination host 30.

The distributed placement processing unit 123 decides the hosts 30 with large surplus resource amounts as the preferential allocation destination hosts 30 to which the VMs are preferentially allocated in the plural hosts 30 (step S4).

The distributed placement processing unit 123 pays attention to the preferential computational resource (memory amount) and refers to the resource information 132 to decide the hosts 30 whose surplus resource amounts of the memory amount are as large as the preferential allocation destination hosts 30. In the example represented in FIG. 7, regarding the memory amount, which is the preferential computational resource, host #0 has the largest surplus resource amount and host #3 has the second largest surplus resource amount. Therefore, the distributed placement processing unit 123 decides these hosts #0 and #3 as the preferential allocation destination hosts 30.

The distributed placement processing unit 123 places the VMs configuring the preferentially-allocated cluster to the preferential allocation destination hosts (step S5).

FIG. 10 is a diagram exemplifying the state of placement of VMs on the hosts 30 in the computer system 1 as the one example of the first embodiment.

In FIG. 10, the state in which the VMs "fj-db-1" and "fj-db-0" of the cluster "fj-db" are placed on hosts #0 and #3, respectively, is represented.

Thereafter, in the step S6, the distributed placement processing unit 123 checks whether placement of all VMs on the hosts 30 has been completed.

If placement of all VMs has been completed as the result of the check (see YES route of the step S6), the distributed placement processing unit 123 ends the processing.

On the other hand, if placement of all VMs has not been completed (see NO route of the step S6), the distributed placement processing unit 123 returns to the step S2 and repeatedly executes the subsequent processing.

Due to the placement of the VMs on the hosts 30 in the above-described step S5, the surplus resource amounts of the hosts 30 of the placement destinations are changed.

In the above-described example, due to the placement of the VMs "fj-db-1" and "fj-db-0" on hosts #0 and #3, the surplus resource amounts of these hosts #0 and #3 are changed. The distributed placement processing unit 123 updates the resource information 132 after the placement of the VMs.

FIG. 11 is a diagram exemplifying the resource information 132 after the allocation of the VMs to hosts #0 and #3 in the computer system 1 exemplified in FIG. 1.

In the example represented in the FIG. 11, compared with the resource information 132 exemplified in FIG. 7, the number of CPUs and the memory amount of host #0 are updated to 11 and 123, respectively. Furthermore, the number of CPUs and the memory amount of host #3 are updated to 6 and 96, respectively.

The distributed placement processing unit 123 carries out calculation of the surplus resource ratio regarding each computational resource again by using the values of the updated resource information 132 in the step S2 (step S2).

In the state exemplified in FIG. 11, if the number of CPU cores is 16 and the memory size is 128 GB as the physical resources of each host 30 in the state in which none of VMs is placed (VM non-placed state), the surplus resource ratio of each computational resource is obtained by the following expressions (3) and (4).

$$\text{Surplus resource ratio of CPU} = (11+8+14+6)/(16\times 4)\times 100 = 61\% \quad (3)$$

$$\text{Surplus resource ratio of memory} = (123+64+64+96)/(128\times 4)\times 100 = 68\% \quad (4)$$

In the result of this arithmetic operation, the surplus resource ratio of the CPU is lower than the memory amount. Therefore, thereafter, in the step S3, the distributed placement processing unit 123 pays attention to the CPU as the preferential computational resource and refers to the scheduled use amount of the computational resource about each cluster (see FIG. 9) to identify the cluster whose total scheduled use amount of the number of CPUs is as large as the preferentially-allocated cluster from the remaining unallocated clusters.

In the present example, only one cluster "iwata" is left as the unallocated cluster. Thus, the cluster "iwata" is selected as the preferentially-allocated cluster.

The distributed placement processing unit 123 decides the VMs configuring this preferentially-allocated cluster as VMs preferentially placed on the hosts 30 in a distributed manner. For example, the distributed placement processing unit 123 allocates the VMs "iwata0," "iwata1," and "iwata2" of the cluster "iwata," which is the preferentially-allocated cluster, to the hosts 30.

The distributed placement processing unit 123 pays attention to the preferential computational resource (CPU) and refers to the resource information 132 to decide the hosts 30 whose surplus resource amounts of the CPU are as large as the preferential allocation destination hosts 30. In the example represented in FIG. 11, regarding the CPU, which is the preferential computational resource, host #2 has the largest surplus resource amount and host #0 has the second largest surplus resource amount and host #1 has the third largest surplus resource amount. Therefore, the distributed placement processing unit 123 decides these host #0, host #1, and host #2 as the preferential allocation destination hosts 30 (step S4).

The distributed placement processing unit 123 places the VMs configuring the preferentially-allocated cluster to the preferential allocation destination hosts (step S5).

FIG. 12 is a diagram exemplifying the state of placement of VMs on the hosts 30 in the computer system 1 as the one example of the first embodiment.

In the example represented in FIG. 12, the state in which the VMs "iwata1," "iwata0," and "iwata2" of the cluster "iwata" are placed on hosts #0, #1, and #2, respectively, after the placement of the VMs represented in FIG. 10 is represented.

Thereafter, in the step S6, the distributed placement processing unit 123 checks whether placement of all VMs on the hosts 30 has been completed again.

If placement of all VMs has not been completed (see NO route of the step S6), the distributed placement processing unit 123 returns to the step S2 and repeatedly executes the subsequent processing.

Furthermore, if placement of all VMs has been completed as the result of the check (see YES route of the step S6), the distributed placement processing unit 123 ends the processing. In the present example, by placing the respective VMs configuring the cluster "iwata," the placement of all VMs is completed.

(B) Operation

Figure 14:
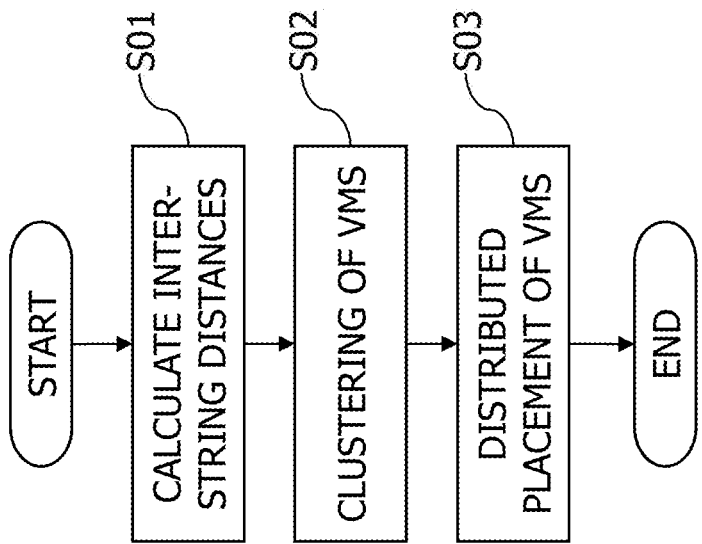
FIG. 14 is a flowchart for explaining a placement method of VMs in a computer system as one example of the first embodiment.

A placement method of VMs in the computer system 1 as the one example of the first embodiment configured as described above will be described in accordance with a flowchart illustrated in FIG. 14 (steps S01 to S03).

The processing represented below is executed when the placement destination (placement destination host 30) of each VM is decided regarding all VMs executed on the present computer system 1 at the time of service start or the like in the present computer system 1, for example.

In the step S01, regarding each of the respective VM names of all VMs included in the present computer system 1, the inter-string distance calculating unit 121 calculates the inter-string distances between the character string configuring each VM name and the VM names of the other VMs.

In the step S02, the clustering processing unit 122 carries out clustering (dividing) of all VMs included in the present computer system 1 into plural clusters based on the inter-string distances calculated by the inter-string distance calculating unit 121.

In the step S03, the distributed placement processing unit 123 places all VMs included in the present computer system 1 on plural hosts 30 in a distributed manner. At this time, in placing the respective VMs included in the plural clusters divided by the clustering processing unit 122 on the plural hosts 30, the distributed placement processing unit 123 places VMs in the same cluster on the different hosts 30 as far as possible. Thereafter, the processing is ended.

(C) Effects

As above, according to the computer system 1 as the one example of the first embodiment, VMs whose VM names are similar are distributed on the different hosts 30 in a distributed manner in the VM placement control unit 120. This may place VMs with similar characteristics on the different hosts 30 and increase in the load at the same clock time may be blocked, for example. Therefore, efficient use of a virtualized computing environment may be implemented.

Furthermore, by paying attention to the VM name and placing VMs with similar characteristics on the different hosts 30, VMs used for the same purpose may be placed on the different hosts 30 and the availability may be improved without the intervention of the user of the VMs.

The inter-string distance calculating unit 121 calculates the distance between the VM names of two VMs. This may quantify the similarity of the VM names and easily implement clustering by the clustering processing unit 122.

The clustering processing unit 122 carries out clustering of plural VMs based on the inter-string distances calculated by the inter-string distance calculating unit 121. This allows the distributed placement processing unit 123 to easily carry out distributed placement of VMs with high similarity.

The distributed placement processing unit 123 carries out distributed placement of plural VMs classified into the same cluster by the clustering processing unit 122 on the different hosts 30. This may place VMs having a similar function on the different hosts 30. Due to this, it is expected that VMs regarding which the timing of the rise of the load is the same may be placed on the different hosts 30 and VMs different in the timing of the rise of the load are placed on the same host 30. Furthermore, leveling of the load of the plural hosts 30 may be achieved and stable system operation may be implemented.

The distributed placement processing unit 123 identifies the computational resource with a low surplus resource ratio as the preferential computational resource based on the computational resources of the hosts 30 and decides the VMs configuring the cluster whose total scheduled use amount of this preferential computational resource is as large as VMs that are preferentially allocated.

Furthermore, the distributed placement processing unit 123 pays attention to the preferential computational resource and decides the cluster whose total scheduled use amount of the preferential computational resource is as large as the preferentially-allocated cluster and decides the VMs configuring this preferentially-allocated cluster as VMs that are preferentially placed on the hosts 30 in a distributed manner.

Moreover, in carrying out the distributed placement of the VMs, the distributed placement processing unit 123 places the VMs on the hosts 30 with large surplus resource amounts preferentially. These features allow the distributed placement processing unit 123 to efficiently allocate the VMs to the hosts 30.

(II) Description of Second Embodiment

In the above-described first embodiment, the method in which the placement destination (placement destination host 30) of each VM is decided regarding all VMs executed on the computer system 1 is represented. However, techniques of the disclosure are not limited thereto.

In the present second embodiment, a method will be represented in which VMs are relocated on the optimum host 30 in the state in which plural VMs have been already placed on two or more hosts 30 in a distributed manner. It is desirable to carry out relocation of VMs to be represented below at a periodic timing, such as once a day.

The computer system 1 of the present second embodiment has similar hardware configuration (see FIG. 1 and FIG. 2) and functional configuration (see FIG. 3) as the first embodiment and detailed description thereof is omitted.

In the present second embodiment, the inter-string distance calculating unit 121 calculates the inter-string distances based on the VM name with the combinations of all VMs regarding each host 30.

The clustering processing unit 122 carries out clustering of the VMs regarding each host 30 based on the calculated inter-string distances.

Here, if a sufficiently-large cluster is created as the result of the clustering, for example, if a cluster in which the number of configuring VMs is equal to or larger than a given number (threshold) is created, this means that many VMs with similar characteristics are placed on the host 30. Thus, in the present second embodiment, the distributed placement processing unit 123 migrates (transfers) VMs that belong to the cluster in which the number of VMs is equal to or larger than the given number (threshold) to the different host 30. Hereinafter, the cluster in which the number of VMs is equal to or larger than the given number (threshold) will be often referred to as the many-VMs cluster.

The detection of the many-VMs cluster is not limited to the method in which the detection is carried out by comparing the number of VMs configuring the cluster and the threshold as described above, and may be carried out with various modifications. For example, if VMs are placed with a bias of the number of VMs having similar VM names among the hosts 30, the cluster having many similar VM names may be regarded as the many-VMs cluster.

It is desirable for the distributed placement processing unit 123 to take note of the following points when transferring VMs in a many-VMs cluster generated based on plural VMs on one host 30 to another host 30.

For example, creation of a new many-VMs cluster on the transfer destination host 30 due to the transfer of the VMs from the host 30 to another host 30 is avoided. Furthermore, the resource use rate of the transfer destination host 30 of the VMs is kept from becoming excessive.

For example, the distributed placement processing unit 123 relocates the VMs in such a manner that exceeding of the upper limit of the resource use rate is avoided by a method exemplified below. For example, similarly to the first embodiment, the distributed placement processing unit 123 carries out distributed placement on the hosts 30 having room in the resource from the cluster whose total resource use rate is high preferentially. Furthermore, if candidates for the host 30 that satisfies the limitation are only the hosts 30 that do not have room in the resource use rate, VMs are placed with replacement by VMs regarding which the many-VMs cluster does not exist on the transfer source host 30.

As above, according to the computer system 1 as the one example of the second embodiment, relocation is carried out in such a manner that distributed placement of VMs whose VM names are similar on the different hosts 30 is carried out. Due to this, the VMs are relocated to achieve leveling of the load of the plural hosts 30 and the present computer system 1 may be kept in a stable state.

(III) Description of Third Embodiment

In the above-described second embodiment, a bias of VMs among the hosts 30 is detected based on the current VM placement and relocation is carried out. However, techniques of the disclosure are not limited thereto.

In the present third embodiment, at the time of addition of a new VM, the host 30 on which the number of VMs similar to the newly-added VM in characteristics is small is selected and the VM is placed thereon.

Similarly to the above-described second embodiment, the inter-string distance calculating unit 121 calculates the inter-string distances based on the VM name with the combinations of all VMs regarding each host 30. Furthermore, the clustering processing unit 122 carries out clustering of the VMs regarding each host 30 based on the calculated inter-string distances.

Moreover, in the present third embodiment, the distributed placement processing unit 123 checks whether a cluster including a VM with a short inter-string distance from the VM name of the newly-added VM exists regarding each of all hosts 30 included in the present computer system 1. For example, the distributed placement processing unit 123 checks whether a cluster including a VM similar to the newly-added VM in characteristics exists regarding each of all hosts 30 included in the present computer system 1.

For this purpose, the inter-string distance calculating unit 121 may calculate the inter-string distances between the VM name of the VM which the host 30 is caused to newly create and the VM names of the respective VMs placed on the respective hosts 30 included in the present computer system 1. Furthermore, the inter-string distance calculating unit 121 may calculate the inter-string distances of the VM name between one or more VMs (representative VM) selected from each cluster possessed by the respective hosts 30 included in the present computer system 1 and the newly-added VM.

The distributed placement processing unit 123 checks whether a cluster including a VM with a short inter-string distance from the VM name of the VM to be newly created by the VM creation function of the host 30 exists. If a cluster including a VM with a short inter-string distance from the VM name of the newly-created VM does not exist as the result of this check, the host 30 of the placement destination of the newly-created VM may be decided from the plural hosts 30 with attention paid only to the computational resources.

On the other hand, if a cluster including a VM with a short inter-string distance from the VM name of the newly-created VM exists, the host 30 with a low resource use rate may be preferentially decided as the placement destination of the newly-created VM from the hosts 30 other than the host 30 on which the cluster exists.

As above, according to the computer system 1 of the third embodiment, the VM to be newly created by the VM creation function of the host 30 may be placed on the host 30 on which the number of VMs close to the new VM in characteristics is small. Due to this, it is expected that VMs regarding which the timing of the rise of the load is the same may be placed on the different hosts 30 and VMs different in the timing of the rise of the load are placed on the same host 30. Furthermore, leveling of the load of the plural hosts 30 may be achieved and stable system operation may be implemented.

(IV) Others

Furthermore, the techniques of the disclosure are not limited to the above-described embodiments and may be carried out with various modifications without departing from the gist of the present embodiments. The respective configurations and the respective kinds of processing in the present embodiments may be chosen according to need or may be combined as appropriate.

For example, the configuration of the computer system 1 is not limited to the configuration exemplified in FIG. 1 and may be implemented with appropriate changes. For example, the number of hosts 30 may be three or smaller or be five or larger. Furthermore, the computer system 1 may include plural management servers 10 and these plural management servers 10 may have functions of the respective units illustrated in FIG. 3 in a distributed manner.

Moreover, in the above-described embodiments, the surplus resource ratio of the CPU and the memory is represented in percentage (% value). However, the configuration is not limited thereto and may be implemented with appropriate changes.

The VM placement control methods represented in the above-described respective embodiments may be carried out in combination with another placement method based on monitoring of the resource use rate, for example. Furthermore, in the above-described respective embodiments, the inter-string distance is used as the value that represents the similarity between VM names. However, the method is not limited thereto. For example, the similarity between VM names may be represented by using a method other than the inter-string distance.

Furthermore, it is possible to carry out and manufacture the present embodiments by those skilled in the art based on the above disclosure.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An information processing apparatus that arranges virtual machines, the information processing apparatus comprising:
   a memory; and
   a processor coupled to the memory and configured to:
   determine a similarity of names of a plurality of virtual machines,
   divide the plurality of virtual machines into clusters, based on a result of the determination, such that virtual machines having a value that represents the similarity of the names that is equal to or less than a given threshold are included in a first cluster and virtual machines having a value that represents the similarity of the names that is greater than the given threshold are included in a second cluster,
   place virtual machines included in the first cluster on different host machines,
   determine, between the first cluster and the second cluster, a target cluster comprising virtual machines with a largest total scheduled use amount of a computational resource whose ratio of a surplus resource that is unused is lowest in computational resources with which the plurality of host machines are equipped, and
   place virtual machines included in the target cluster on host machines prior to placing virtual machines included in the remaining cluster.

2. The information processing apparatus of claim 1, wherein
   the processor obtains a value that represents the similarity of the names by calculating inter-string distances among names of the plurality of virtual machines.

3. The information processing apparatus of claim 1, wherein
   in placing the virtual machines on the host machines, the processor places the virtual machines on a host machine with a largest amount of surplus resources first.

4. The information processing apparatus of claim 1, wherein the ratio of surplus resource is a total of surplus resource amount of the plurality of host machines to a total amount of resources of the plurality of host machines.

5. An information processing system comprising:
   a plurality of host machines each including a first processor; and
   a management apparatus including a second processor configured to arrange virtual machines on a plurality of host machines, wherein
   the second processor is configured to:
   determine a similarity of names of the plurality of virtual machines,
   divide the plurality of virtual machines into clusters, based on a result of the determination, such that virtual machines having a value that represents the similarity of the names that is equal to or less than a given threshold are included in a first cluster and virtual machines having a value that represents the similarity of the names that is greater than the given threshold are included in a second cluster,
   place virtual machines included in the first cluster on different host machines,
   determine, between the first cluster and the second cluster, a target cluster comprising virtual machines with a largest total scheduled use amount of a computational resource whose ratio of a surplus resource that is unused is lowest in computational resources with which the plurality of host machines are equipped, and place virtual machines included in the target cluster on host machines prior to placing virtual machines included in the remaining cluster.

6. The information processing system of claim 5, wherein the second processor obtains a value that represents the similarity of the names by calculating inter-string distances among names of the plurality of virtual machines.

7. The information processing system of claim 5, wherein in placing the virtual machines on the host machines, the second processor places the virtual machines on a host machine with a largest amount of surplus resources first.

8. A non-transitory, computer-readable recording medium having stored therein a program for causing a computer to execute a process comprising:

determining a similarity of names of a plurality of virtual machines;

dividing the plurality of virtual machines into clusters, based on a result of the determination, such that virtual machines having a value that represents the similarity of the names that is equal to or less than a given threshold are included in a first cluster and virtual machines having a value that represents the similarity of the names that is greater than the given threshold are included in a second cluster;

placing virtual machines included in the first cluster on different host machines;

determining, between the first cluster and the second cluster, a target cluster comprising virtual machines with a largest total scheduled use amount of a computational resource whose ratio of a surplus resource that is unused is lowest in computational resources with which the plurality of host machines are equipped; and placing virtual machines included in the target cluster on host machines prior to placing virtual machines included in the remaining cluster.

9. The non-transitory, computer-readable recording medium of claim 8, the process further comprising:

obtaining a value that represents the similarity of the names by calculating inter-string distances among names of the plurality of virtual machines.

10. The non-transitory, computer-readable recording medium of claim 8, wherein in placing the virtual machines on the host machines, the virtual machines are placed on a host machine with a largest amount of surplus resources first.

* * * * *